US011233572B2

(12) United States Patent
Lee et al.

(10) Patent No.: US 11,233,572 B2
(45) Date of Patent: Jan. 25, 2022

(54) SLICE CONNECTION METHOD OF OPTICAL ACCESS NETWORK AND OPTICAL ACCESS NETWORK SYSTEM FOR SLICE CONNECTION

(71) Applicant: Electronics and Telecommunications Research Institute, Daejeon (KR)

(72) Inventors: Han Hyub Lee, Daejeon (KR); Jung-yeol Oh, Sejong-si (KR); Kwang Ok Kim, Jeonju-Si (KR); Kyeong Hwan Doo, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/103,338

(22) Filed: Nov. 24, 2020

(65) Prior Publication Data
US 2021/0159984 A1 May 27, 2021

(30) Foreign Application Priority Data
Nov. 27, 2019 (KR) ........................ 10-2019-0154305

(51) Int. Cl.
*H04B 10/27* (2013.01)

(52) U.S. Cl.
CPC .................................... *H04B 10/27* (2013.01)

(58) Field of Classification Search
CPC .............. H04B 10/27; H04B 10/25752; H04Q 11/0067; H04Q 2011/0086
See application file for complete search history.

(56) References Cited

U.S. PATENT DOCUMENTS

| 10,461,874 | B2 | 10/2019 | Kim et al. | |
|---|---|---|---|---|
| 2018/0123723 | A1 | 5/2018 | Lee et al. | |
| 2019/0207680 | A1* | 7/2019 | Wang | ................... H04L 61/6022 |
| 2020/0322052 | A1* | 10/2020 | Yigit | ........................ G06F 16/22 |
| 2021/0051070 | A1* | 2/2021 | Akman | ................... H04W 4/50 |
| 2021/0051108 | A1* | 2/2021 | Akman | ............... H04L 47/2416 |

FOREIGN PATENT DOCUMENTS

| CN | 108111931 | 6/2018 |
|---|---|---|
| CN | 108632945 | 10/2018 |
| JP | 6525367 | 5/2019 |
| KR | 10-2013-0095314 | 8/2013 |
| KR | 10-2019-0087516 | 7/2019 |
| KR | 10-2019-0094242 | 8/2019 |
| KR | 10-2019-0108371 | 9/2019 |

* cited by examiner

*Primary Examiner* — Dzung D Tran
(74) *Attorney, Agent, or Firm* — Kile Park Reed & Houtteman PLLC

(57) ABSTRACT

Disclosed is a slice connection method of an optical access network and an optical access network system for slice connection. A slice connection method performed by an optical network unit (ONU) of an optical access network system may include determining a service type of a host device transmitting a service connection request, determining a slice based on the service type, sending a request for connection to the slice to an optical line terminal (OLT), and relaying data transmission and reception between the OLT and the host device when a slice connection response corresponding to the request is received from the OLT.

4 Claims, 12 Drawing Sheets

SLICE CONNECTION METHOD OF OPTICAL ACCESS NETWORK AND OPTICAL ACCESS NETWORK SYSTEM FOR SLICE CONNECTION

CROSS-REFERENCE TO RELATED APPLICATION(S)

This application claims the benefit of Korean Patent Application No. 10-2019-0154305, filed on Nov. 27, 2019, in the Korean Intellectual Property Office, the disclosure of which is incorporated herein by reference.

BACKGROUND

1. Field of the Invention

One or more example embodiments relate to an optical access network system and method, and more particularly, to a method of connecting slices in an optical access network system.

2. Description of the Related Art

An optical access network system is built/operated as a separate network to provide a mobile fronthaul, a small cell backhaul, and the high-speed Internet. In the future, the optical access network system needs to accept mobile/business/residential services as a single optical distribution network.

However, a typical optical access network system is implemented as a device of which functions are fixed for services. Thus, the typical optical access network system is required to newly build and operate a device for a new service for accepting the corresponding service. Also, the typical optical access network system has structural limitations in rapid introduction/expansion of new services.

Accordingly, there is a desire for a method of quickly introducing a new service in an optical access network system or providing various services in a single optical distribution network.

SUMMARY

An aspect provides an optical access network system that divides a single optical distribution network into a plurality of logical optical access network slices, and selects and combines optical access network slices based on a service feature requested by a host device.

Another aspect also provides an optical access network system for providing a data transmitting and receiving function optimized for a service required by a host device.

According to an aspect, there is provided a slice connection method performed by an optical network unit (ONU) in an optical access network, the method including determining a service type of a host device transmitting a service connection request, determining a slice based on the service type, sending a request for connection to the slice to an optical line terminal (OLT), and relaying data transmission and reception between the OLT and the host device when a slice connection response corresponding to the request is received from the OLT.

The slice connection method may further include receiving, from the OLT, slice information comprising a list of slices connectable in the OLT and service types respectively matching the slices. The determining of the slice may include retrieving a service type of the host device from the slice information and determining a slice matching the retrieved service type to be a slice corresponding to the host device.

The relaying of the data transmission and reception may include transmitting data received from the host device to an OLT through an upstream based on a priority set to the slice, and transmitting data received through a downlink from the OLT to the host device.

The slice connection method may further include requesting an OLT to generate a new slice when a slice corresponding to the service type is absent, receiving a connection response to a new slice from an OLT generating the new slice in accordance with the requesting, and relaying data transmission and reception between the OLT and the host device based on a band allocated to the new slice.

When a new slice connection is requested from an ONU, the OLT may generate a new slice corresponding to the service type and allocate a bandwidth and a priority to the new slice.

The OLT may retrieve a slice corresponding to the service type. When a slice corresponding to the service type and not including the ONU is retrieved, the OLT may add the new slice to a slicing including the retrieved slice.

According to another aspect, there is also provided a slice connection method performed by an ONU in an optical access network, the method including receiving a new service connection request from a host device, identifying a service type corresponding to the new service connection request, requesting a new slice connection from an OLT based on the service type, receiving a connection for a new slice from an OLT generating a new slice in accordance with a request, and relaying data transmission and reception between the OLT and the host device based on a band allocated to the new slice.

The OLT may retrieve a slice corresponding to the service type, generate a new slice corresponding to the service type when a slice corresponding to the service type is not retrieved, and allocate a bandwidth and a priority to the new slice.

The OLT may retrieve a slice corresponding to the service type, add, when a slice corresponding to the service type and not including the ONU is retrieved, the ONU to the retrieved slice, set the slice to which the ONU is added to be a new slice, and transmit the new slice to the ONU.

According to another aspect, there is also provided a slice connection method performed by an OLT in an optical access network, the method including generating a slice corresponding to a service type of a host device, transmitting slice information including service types respectively corresponding to the slices to an ONU, receiving, from the ONU, a request for connection to a slice determined by the ONU based on the service type of the host device, and performing data transmission and reception with the host device by transmitting a slice connection response to the ONU when a slice for which the connection is requested is retrieved.

The slice connection method may further include determining a bandwidth and a priority corresponding to each of the slices. The slice information may include a bandwidth and a priority allocated to each of the slices and a service type corresponding to each of the slices.

The performing of the data transmission and reception with the host device may include relaying data transmission and reception between the OLT and the host device by allocating a band to the data based on a bandwidth and a priority included in slice information of a slice determined by the ONU based on the service type of the host device.

According to another aspect, there is also provided an optical access network system including an ONU that determines a service type of a host device transmitting a service connection request, determines a slice based on the service type, sends a request for connection to the slice from an OLT, and relays data transmission and reception between the OLT and the host device when a slice connection request corresponding to the request is received, and an OLT that generates a slice corresponding to a service type of a host device, transmits slice information including a service type corresponding to each of the slices to an ONU, and transmits a slice connection response to the ONU when the request is received from the ONU.

The ONU may retrieve a service type of the host device from the slice information and determine a slice matching the retrieved service type to be a slice corresponding to the host device.

When a slice corresponding to the service type is absent, the ONU may request an OLT to generate a new slice. The OLT may generate a new slice, allocate a bandwidth and a priority to the new slice, and transmit a connection response for the new slice to the ONU.

When the connection response for the new slice is received, the ONU may relay data transmission and reception between the OLT and the host device based on a band allocated to the new slice.

According to example embodiments, it is possible to provide various services by dividing a single optical distribution network into a plurality of logical optical access network slices, and selecting and combining optical access network slices based on a service feature requested by a host device.

According to example embodiments, it is possible to provide a data transmitting and receiving function optimized for a service required by a host device by generating and registering a slice related to a service, connecting slices corresponding to a service feature required by the host device, and determining a bandwidth and a transmission priority for the service.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
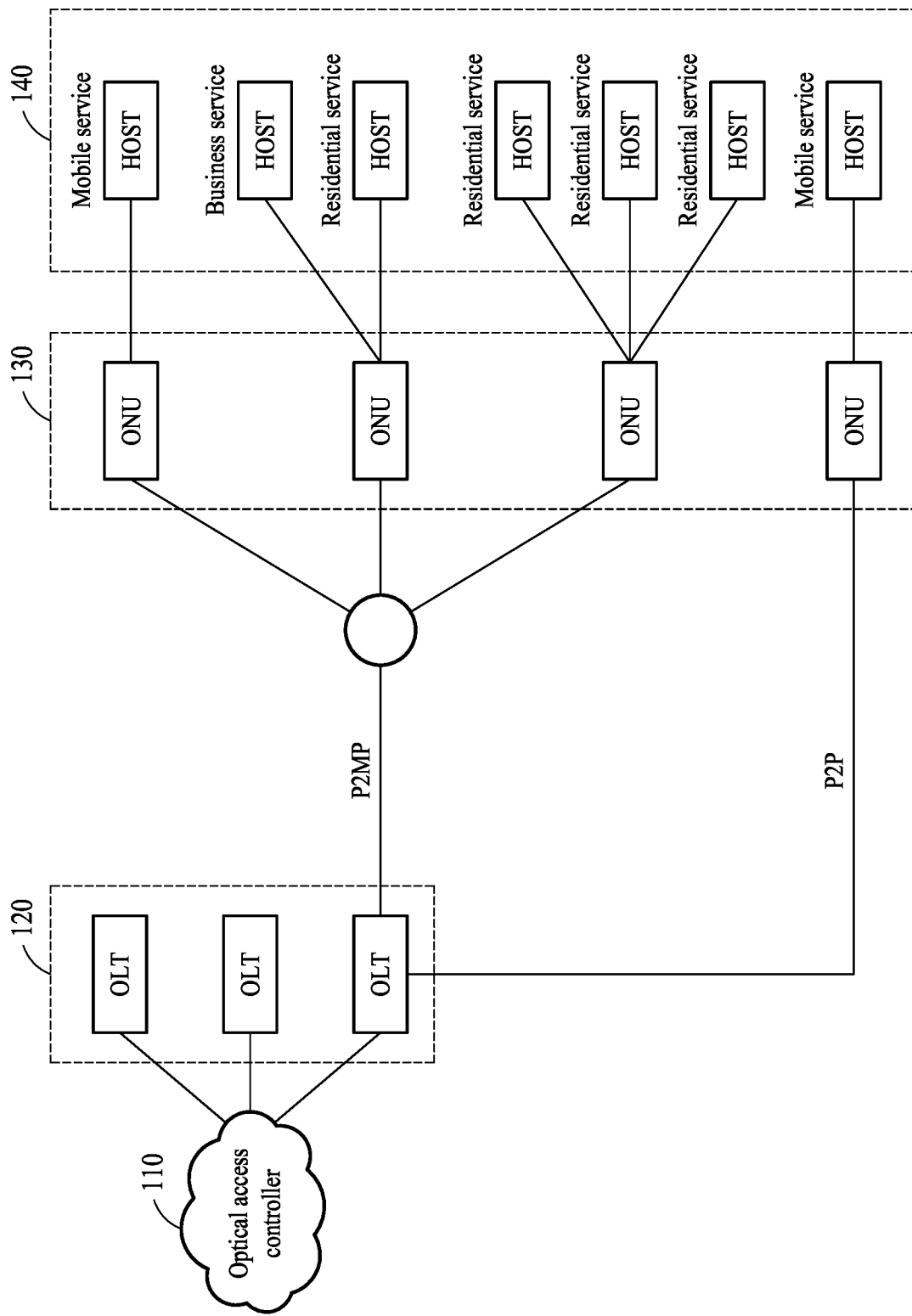
FIG. 1 is a diagram illustrating an optical access network system for slice connection according to an example embodiment of the present disclosure.

The following detailed description is provided to assist the reader in gaining a comprehensive understanding of the methods, apparatuses, and/or systems described herein. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating an optical access network system for slice connection according to an example embodiment of the present disclosure.

An optical access network system may include an optical access controller 110, an optical line terminal (OLT) 120, an optical network unit (ONU) 130, and host devices 140 as illustrated in FIG. 1.

The optical access controller 110 may be connected to one or more OLTs 120 and control or manage the connected OLTs 120. In this instance, the optical access controller 110 may receive slice information of a slice generated by the OLT 120 from the OLTs 120 and manage the received slice information.

The OLT 120 may be connected to a plurality of ONUs 130 through an optical distribution network. In this instance, the OLT 120 may generate, for each service type, a slice corresponding to the corresponding service type and determine a bandwidth and a priority of the generated slice. Also, the OLT 120 may transmit a list of generated slices and slice information of each of the slices to the optical access controller 110 and the ONU 130.

In addition, the OLT 120 may use a dynamic bandwidth allocation (DBA) technique to allocate a bandwidth to each of the connected ONUs 130. Specifically, the OLT 120 may apply a bandwidth report required by the ONUs 130 to a DBA algorithm and determine a bandwidth to be allocated to each of the ONUs 130. Also, the OLT 120 may determine a bandwidth and a priority based on a service type of the ONU 130.

The ONU 120 may be connected to one or more host devices 140 and receive a service connection request from one of the host devices 140.

In this instance, the ONU 130 may identify a service type of the host device 140 transmitting the service connection request. For example, when the service connection request is received from the host device 140, the ONU 130 may identify a service of the host device 140 using class of service (CoS) or differentiated service code point (DSCP)-ToS. Also, the ONU 130 may connect and manage the host device 140 for each slices using GEM PortID, MAC/IP/VLANID address.

In addition, the ONU 130 may determine a slice based on the identified service type. In this instance, the ONU 130 may transmit a slice connection request for the determined slice to the OLT 120, thereby requesting connection to the determined slice from the OLT 120. In this instance, the OLT 120 may verify whether the slice to which the connection is requested by the ONU 130 is present. When the slice is identified, the OLT 120 may transmit a slice connection response to the ONU 130.

In this instance, the ONU 130 receiving the slice connection response to the slice connection request from the OLT 120 may relay data transmission and reception between the OLT 120 and the host device 140. Also, the OLT 120 may report, to the optical access controller 110, that the slice is connected.

In addition, when the host device 140 requests connection to a new service that has not been registered, the OLT 120 may generate a slice for the new service requested by the host device 140.

Also, the optical access controller 110 may generate a slice and transmit slice information of the generated slice to the connected OLTs 120. In this instance, the OLT 120 may perform only a slice connection managing function instead of a slice generation function.

In addition, the slice generated by the optical access controller 110 or the OLT 120 may be an optical access network slice connected to the ONU 130 and the OLT 120 corresponding to the service type. For example, the slice may be generated in an intra OLT optical access network slice structure using a physical layer structure connecting a single OLT and a plurality of ONUs, or using an inter OLT optical access network slice structure using a physical layer structure connecting a plurality of OLTs and a plurality of ONUs. Also, the slice may be generated in an ONU port level slice structure in which all logic/physical ports of the ONU 130 are allocated to a single virtualized network, or a shared ONU virtualization structure that extends virtualization to a queue and port level.

In addition, a physical attribute of the slice may include a bandwidth and a service priority. The service priority may be associated with a latency. Thus, a high priority of the slice may infer that a latency for data transmission of a service type corresponding to the slice is short.

The host device 140 may be a device for providing different services to a user as illustrated in FIG. 1. Also, when the user requests a service through a user terminal, the host device 140 may transmit a service connection request corresponding to the service requested by the user to the ONU 130.

An optical access network system according to an example embodiment of the present disclosure may divide a single optical distribution network into a plurality of logical optical access network slices, and select and combine optical access network slices based on a service type requested from a host device, thereby providing various services.

Further, an optical access network system according to an example embodiment of the present disclosure may provide a data transmission and reception function optimized to a service requested from a host device by generating a slice related to a service, registering the slice, and connecting the slice corresponding to a service type requested by the host device such that a bandwidth and a transmission priority of the service are determined.

Figure 2:
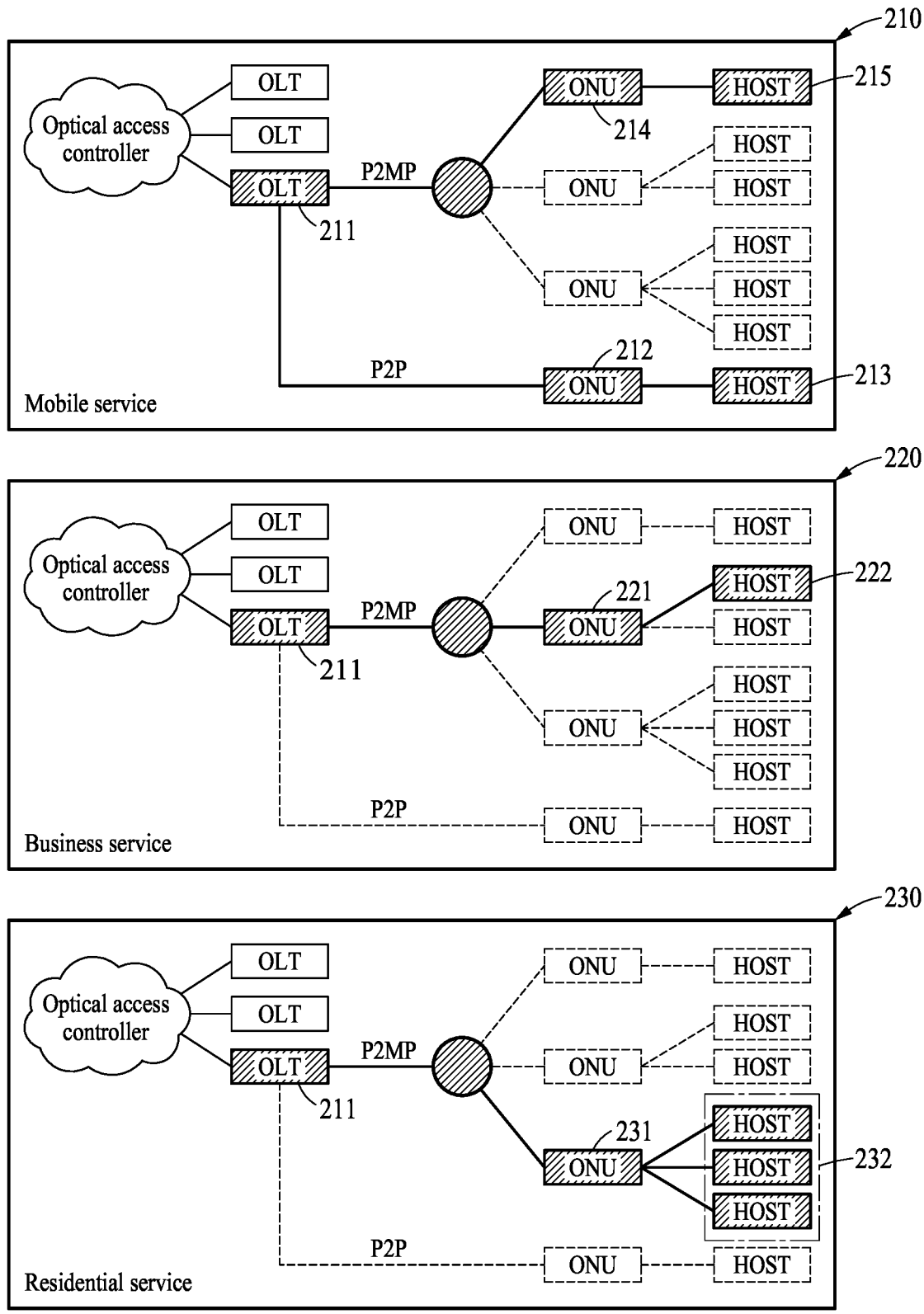
FIG. 2 illustrates an example of slices generated according to an example embodiment of the present disclosure.

FIG. 2 illustrates an example of slices generated according to an example embodiment of the present disclosure.

The optical access controller 110 or the OLT 120 may configure mobile service slicing, business service slicing, and residential service slicing based on a service type to be provided in an optical access network system. In addition, the optical access controller 110 or the OLT 120 may virtualize the optical access network system to operate a mobile service-dedicated optical access network 210 corresponding to the mobile service slicing, a business service-dedicated optical access network 220 corresponding to the business service slicing, and a residential service-dedicated optical access network 230 corresponding to a residential service.

In this instance, each slicing may include different slices connected to different host devices. For example, the mobile service-dedicated optical access network 210 may include a slice for providing the mobile service to a host device 215 through an OLT 211 and an ONU 214 and a slice for providing the mobile service to a host device 213 through the OLT 211 and an ONU 212.

In addition, the business service-dedicated optical access network 220 may include a slice for providing the business service to a host device 222 through the OLT 211 and an ONU 221 and a slice for providing the residential service to host devices 232 through the OLT 211 and an ONU 231.

Figure 3:
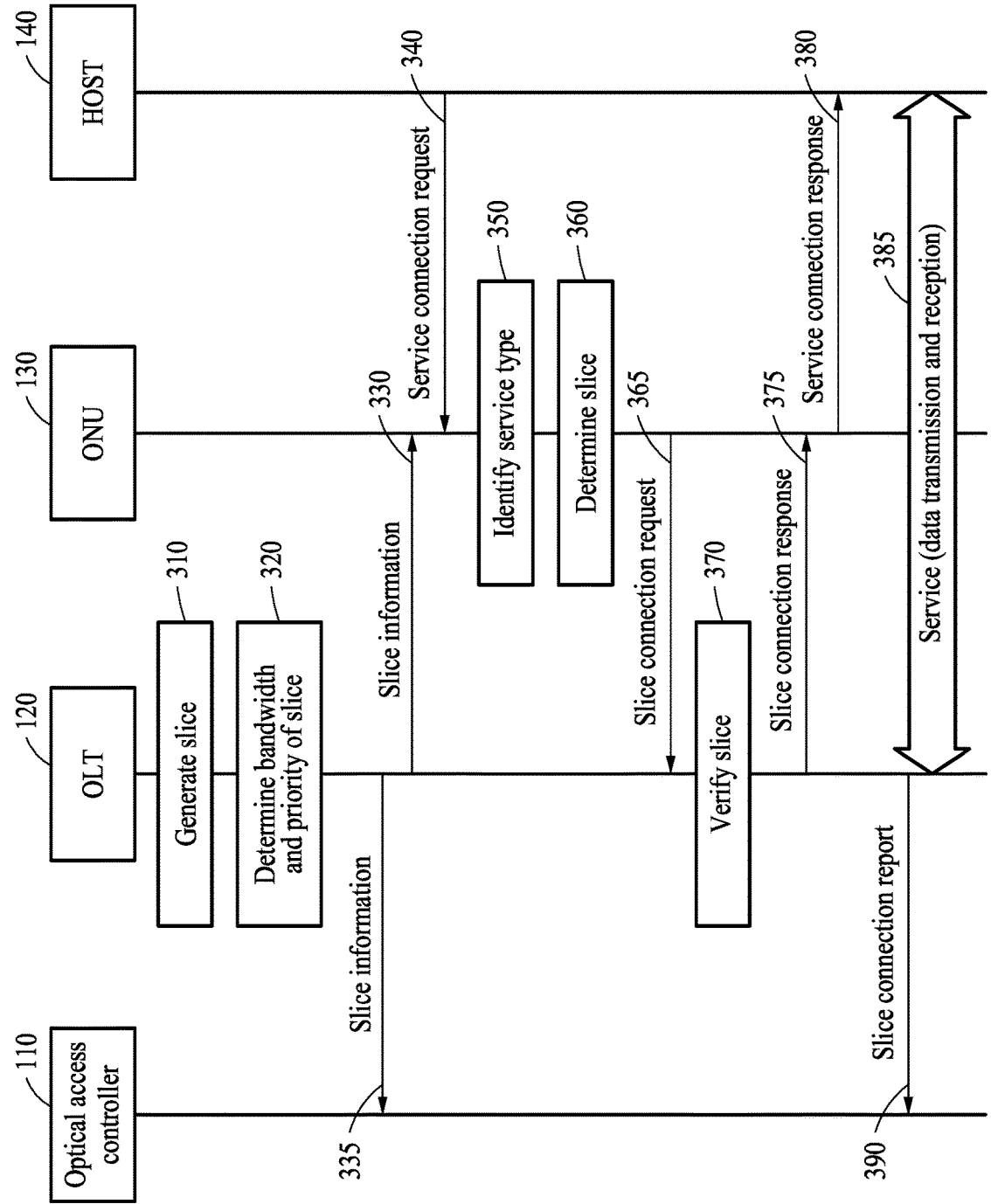
FIG. 3 is a diagram illustrating a process of slice connection performed in an optical access network system according to an example embodiment of the present disclosure.

FIG. 3 is a diagram illustrating a process of slice connection performed in an optical access network system according to an example embodiment of the present disclosure.

In operation 310, the OLT 120 may generate a slice corresponding to a service type of a host device.

In operation 320, the OLT 120 may determine a bandwidth and a priority corresponding to each slice generated in operation 310.

In operation 330, the OLT 120 may transmit slice information including a list of slices connectable in the OLT 120 and service types matching the slices to the ONU 130. In this instance, the slice information may include the service types corresponding to the slices, bandwidths allocated to the slices, and priorities. In operation 335, the OLT 120 may transmit slice information of the slice generated in operation 310 to the optical access controller 110. In this instance, the optical access controller 110 may manage the received slice information for each service type or for each OLT 120 transmitting the slice information.

In operation 340, the ONU 130 may receive a service connection request from the host device 140.

In operation 350, the ONU 130 may identify a service type of the host device 140 corresponding to the service connection request received in operation 340. Specifically, the ONU 130 may identify a service type of a service requested from the host device 140 through the service connection request.

In operation 360, the ONU 130 may determine a slice based on the service type identified in operation 350. Specifically, the ONU 130 may retrieve the service type of the host device 140 identified in operation 350 from the slice information received in operation 330. Also, the ONU 130 may determine the slice matching the retrieved service type to be a slice corresponding to the host device 140.

In operation 365, the ONU 130 may transmit a slice connection request corresponding to the slice determined in operation 360 to the OLT 120, thereby requesting connection to the slice.

In operation 370, the OLT 120 may verify whether the slice requested from the ONU 130 in operation 365 is present. Specifically, the OLT 120 may retrieve a slice corresponding to the slice connection request received in operation 365 from the slices generated in operation 310. When the slice corresponding to the slice connection request is found, the OLT 120 may determine that the slice is identified and thus, perform operation 375.

In operation 375, the OLT 120 may transmit a slice connection response to the ONU 130.

In operation 380, the ONU 130 may transmit a service connection response to the host device 140 and perform operation 385 to relay data transmission and reception between the OLT 120 and the host device 140.

In operation 390, the OLT 120 may report the slice having a service connected to the host device 140 to the optical access controller 110.

Figure 4:
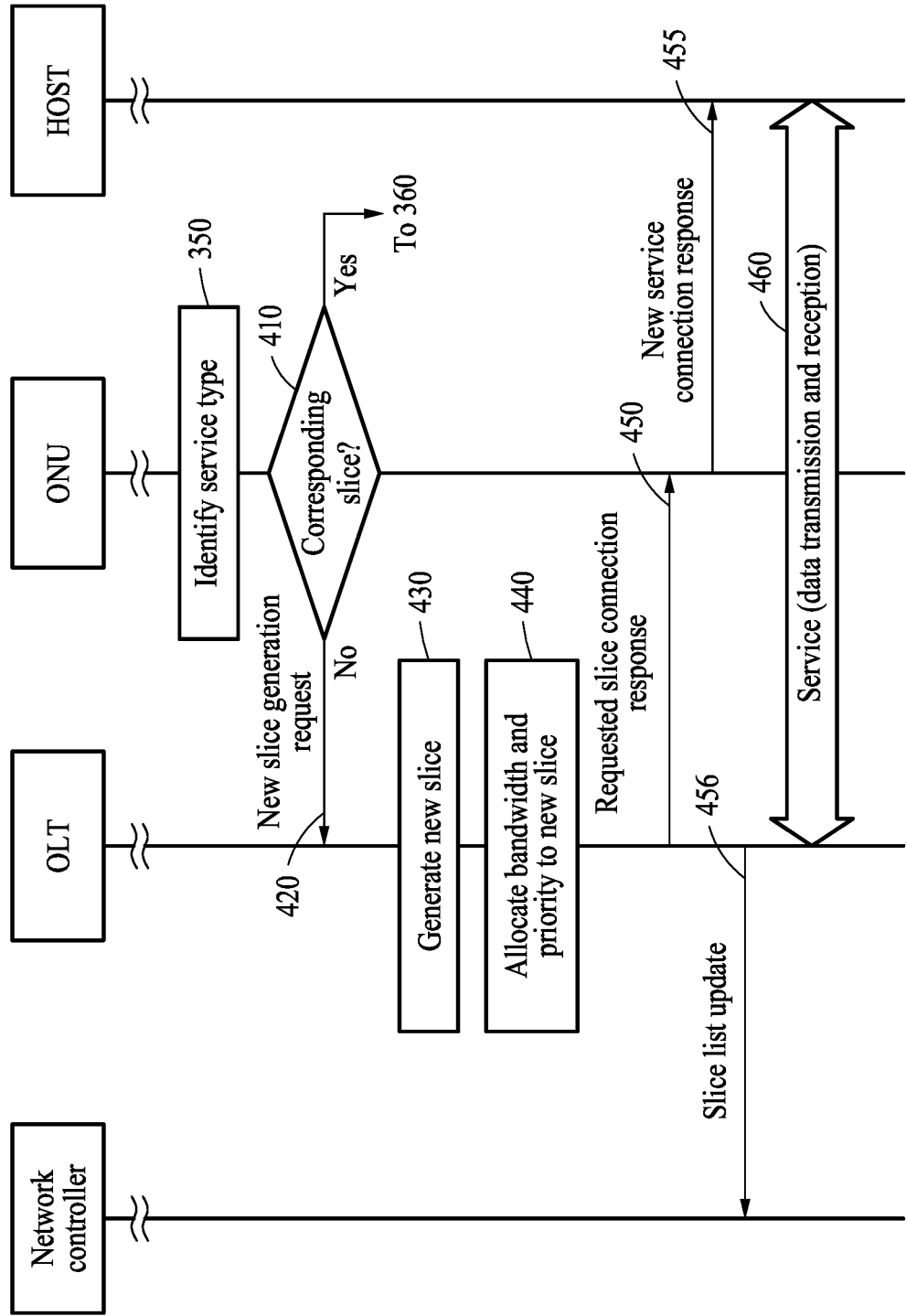
FIG. 4 is a diagram illustrating a process of connecting slices when a slice corresponding to a service type of data transmitted from a host is absent in an optical access network system according to an example embodiment of the present disclosure.

FIG. 4 is a diagram illustrating a process of connecting slices when a slice corresponding to a service type of data transmitted from a host is absent in an optical access network system according to an example embodiment of the present disclosure, which may be performed after operation 350 of FIG. 3.

In operation 410, the ONU 130 may retrieve a service type of the host device 140 identified in operation 350 from the slice information received in operation 330. When the slice corresponding to the service type of the host device 140 identified in operation 350 is retrieved, the ONU 130 may perform operation 360 to determine the retrieved slice matching the service type to be a slice corresponding to the host device 140. In contrast, when the slice corresponding to the service type of the host device 140 identified in operation 350 is not found, the ONU 130 may perform operation 420 to request the OLT 120 to generate a new slice. In this instance, the ONU 130 may request the OLT 120 to generate a new slice and transmit the service type of the host device 140 identified in operation 350.

In operation 430, the OLT 120 may generate a new slice corresponding to the service type of the host device 140 received in operation 420. In this instance, the OLT 120 may retrieve a slice corresponding to the service type of the host device 140 from the slices generated in operation 310. When a slice that corresponds to the service type of the host device 140 and does not include the ONU 130 transmitting a new slice generation request is found, a new slice may be added to a slicing including the found slice.

In operation 440, the OLT 120 may allocate a bandwidth and a priority to the new slice generated in operation 430.

In operation 450, the OLT 120 may transmit a connection response for the new slice to the ONU 130. In this instance, the connection response for the new slice may include information on the bandwidth and the priority allocated to the new slice.

In operation 455, the ONU 130 may transmit a service connection response to the host device 140 and perform operation 460 to relay data transmission and reception between the OLT 120 and the host device 140. In this instance, the ONU 130 may transmit data received from the host device 140 to the OLT 120 through an upstream based on the priority and the bandwidth allocated to the new slice.

In operation 456, the OLT 120 may transmit the slice generated in operation 430 to the optical access controller 110 so that a slice list managed by the optical access controller 110 is updated.

Figure 5:
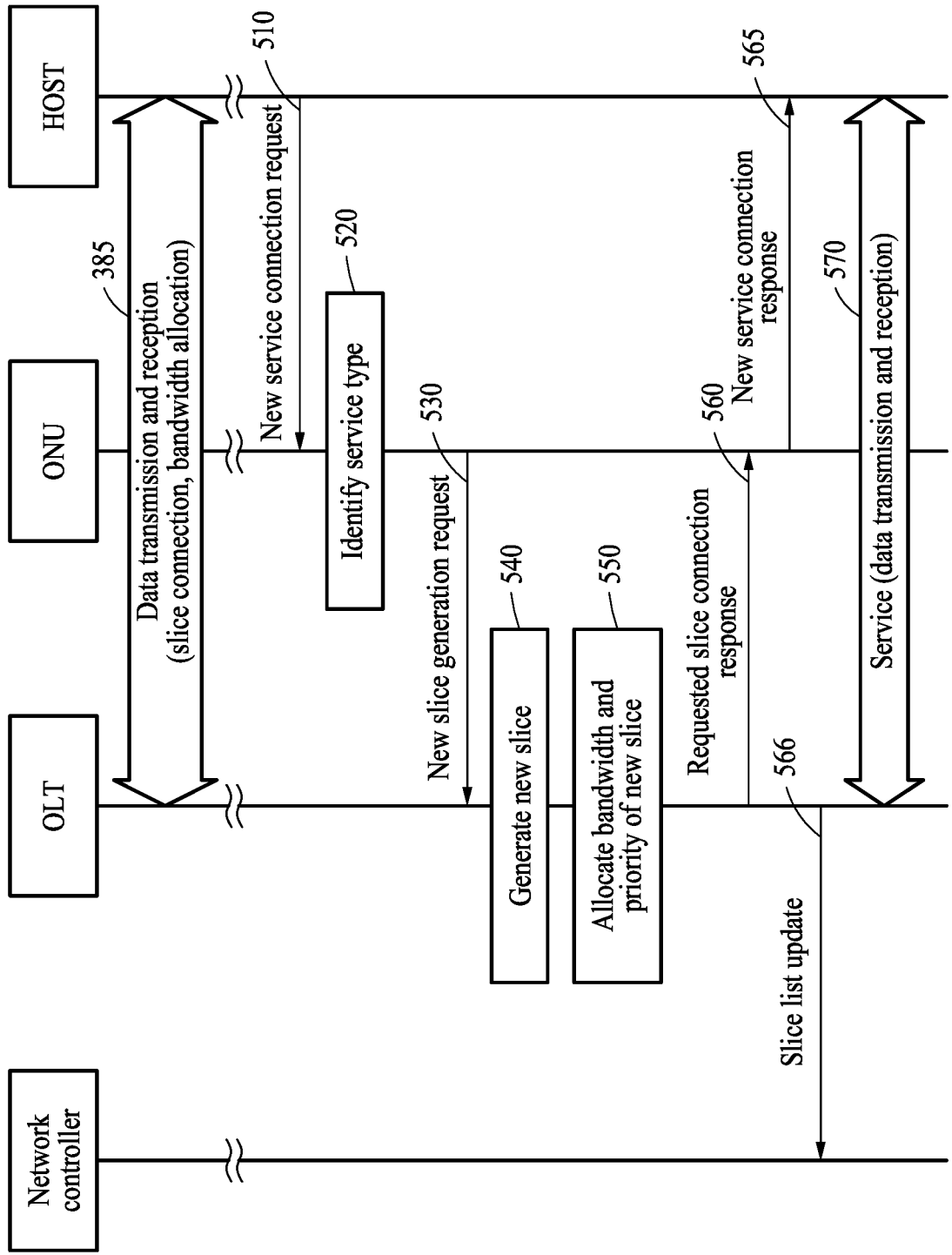
FIG. 5 is a diagram illustrating a process of connecting slices by generating a new slice in an optical access network system according to an example embodiment of the present disclosure.

FIG. 5 is a diagram illustrating operations performed in a case in which the host device 140 requests a new service connection while the ONU 130 relays data transmission and reception between the OLT 120 and the host device 140 as in operation 385.

In operation 510, the host device 140 may send a new service connection request to the ONU 130.

In operation 520, the ONU 130 may identify a service type of the host device 140 corresponding to the new service connection request received in operation 510. Specifically, the ONU 130 may identify a service type of a service requested by the host device 140 through a service connection request.

In operation 530, the ONU 130 may request the OLT 120 to generate a new slice. In this instance, the ONU 130 may request the OLT 120 to generate a new slice and transmit the service type of the host device 140 identified in operation 520.

In operation 540, the OLT 120 may generate a new slice corresponding to the service type of the host device 140 received in operation 530. In this instance, the OLT 120 may retrieve a slice corresponding to the service type of the host device 140 among the slices generated in operation 310. When a slice that corresponds to the service type of the host device 140 and does not include the ONU 130 transmitting the new slice generation request is found, a new slice may be added to a slicing including the found slice.

In operation 550, the OLT 120 may allocate a bandwidth and a priority to the new slice generated in operation 540.

In operation 560, the OLT 120 may transmit a connection response for the new slice to the ONU 130. In this instance, the connection response for the new slice may include information on the bandwidth and the priority allocated to the new slice.

In operation 565, the ONU 130 may transmit a service connection response to the host device 140 and perform operation 570 to relay data transmission and reception between the OLT 120 and the host device 140. In this instance, the ONU 130 may transmit data received from the host device 140 to the OLT 120 through an upstream based on the priority and the bandwidth allocated to the new slice.

In operation 566, the OLT 120 may transmit the slice generated in operation 430 to the optical access controller 110 so that a slice list managed by the optical access controller 110 is updated.

Figure 6:
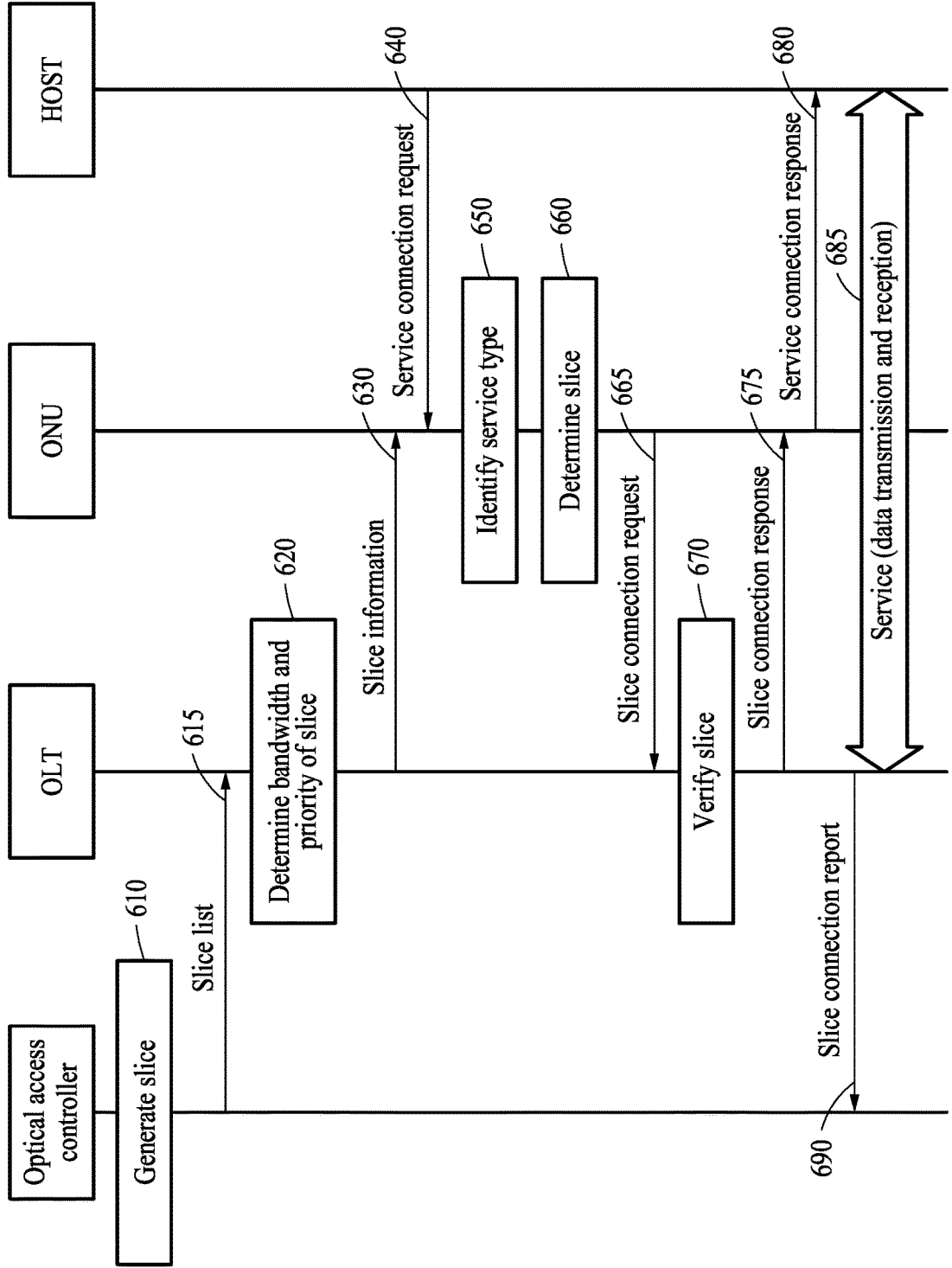
FIG. 6 is a diagram illustrating a process of connecting, by an optical access controller, slices by generating a slice in an optical access network system according to an example embodiment of the present disclosure.

FIG. 6 is a diagram illustrating a process of connecting, by an optical access controller, slices by generating a slice in an optical access network system according to an example embodiment of the present disclosure.

In operation 610, the optical access controller 110 may generate a slice corresponding to a service type of a host device.

In operation 615, the optical access controller 110 may transmit a list of slices generated in operation 610 to the OLT 120.

In operation 620, the OLT 120 may determine a bandwidth and a priority corresponding to each of the slices generated in operation 610.

In operation 630, the OLT 120 may transmit slice information including a list of slices connectable in the OLT 120 and service types matching the slices to the ONU 130. In this instance, the slice information may include the service types corresponding to the slices, bandwidths allocated to the slices, and priorities.

In operation 640, the ONU 130 may receive a service connection request from the host device 140.

In operation 650, the ONU 130 may identify a service type of the host device 140 corresponding to the service connection request received in operation 640. Specifically, the ONU 130 may identify a service type of a service requested from the host device 140 through the service connection request.

In operation 660, the ONU 130 may determine a slice based on the service type identified in operation 650. Specifically, the ONU 130 may retrieve the service type of the host device 140 identified in operation 650 from the slice information received in operation 630. Also, the ONU 130 may determine a slice matching the retrieved service type to be a slice corresponding to the host device 140.

In operation 665, the ONU 130 may transmit a slice connection request corresponding to the slice determined in operation 660 to the OLT 120, thereby requesting connection to the slice.

In operation 670, the OLT 120 may verify whether the slice requested from the ONU 130 in operation 665 is present. Specifically, the OLT 120 may retrieve a slice corresponding to the slice connection request received in operation 665 from the list of slices received in operation 615. When the slice corresponding to the slice connection request is found, the OLT 120 may determine that the slice is identified and thus, perform operation 675.

In operation 675, the OLT 120 may transmit a slice connection response to the ONU 130.

In operation 680, the ONU 130 may transmit a service connection response to the host device 140 and perform operation 685 to relay data transmission and reception between the OLT 120 and the host device 140.

In operation 690, the OLT 120 may report the slice having a service connected to the host device 140 to the optical access controller 110.

Figure 7:
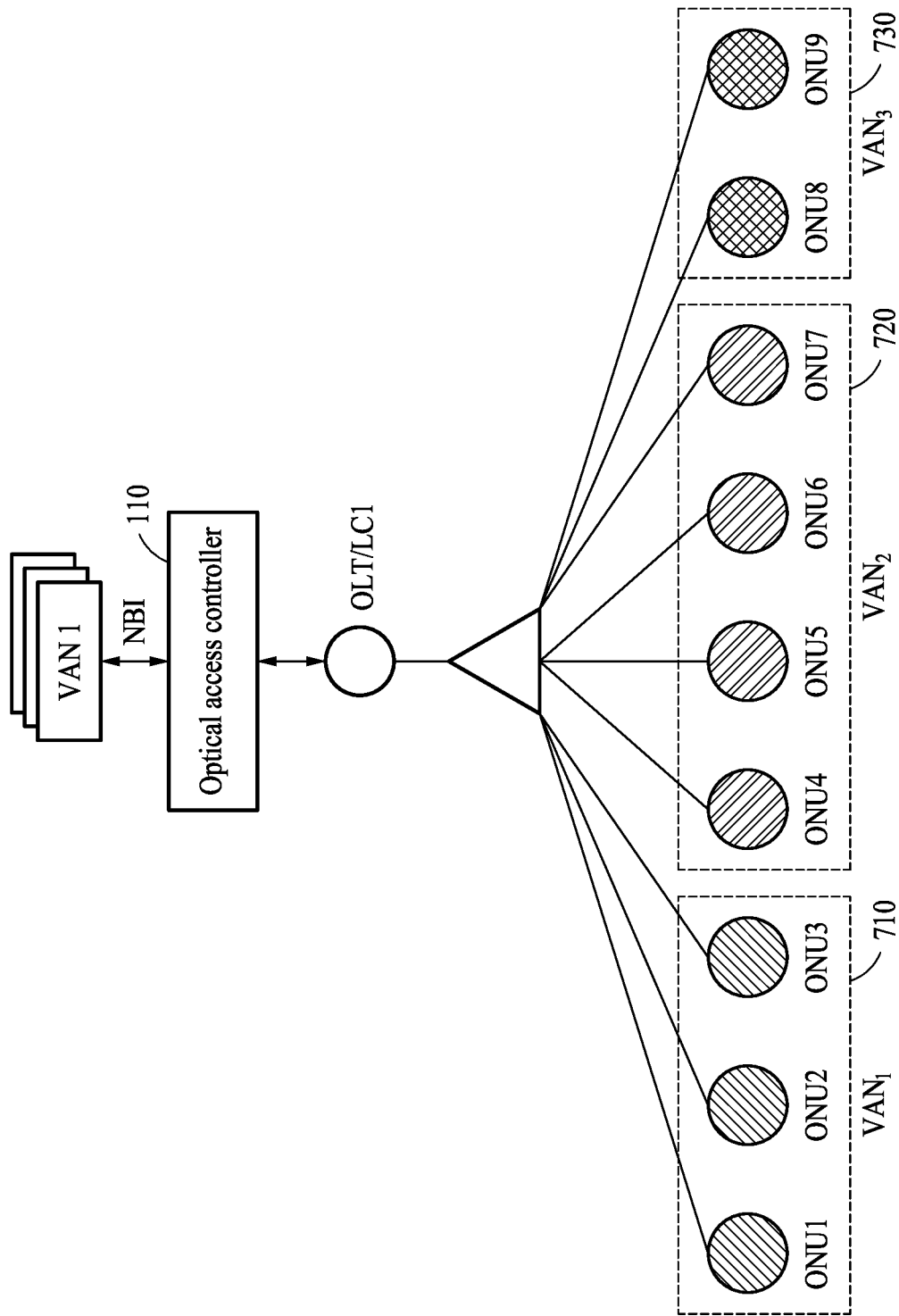
FIG. 7 illustrates an example of a connection of slices managed in an optical access network system according to a first embodiment of the present disclosure.

An optical access network system according to a first embodiment of the present disclosure may manage connections between slices of an optical access network in which a plurality of ONUs is virtualized for a single OLT as illustrated in FIG. 7.

The optical access network system according to the first embodiment of the present disclosure may configure a virtualized optical access network by designating an OLT and an ONU as virtualized OLT and ONU and connecting the virtualized OLT and the virtualized ONU. Also, the optical access network system according to the first embodiment of the present disclosure may slice-connect to the virtualized optical access network.

Specifically, the optical access network system according to the first embodiment of the present disclosure may configure virtual optical access networks (VAN), for example, $VAN_1$ 710, $VAN_2$ 720, and $VAN_3$ 730 by connecting a plurality of ONUs with an OLT according to Table 1.

TABLE 1

| ONU ID Mapping Table | |
|---|---|
| PHY ID | Virtual ID |
| OLT/LC1/ONU1 | VAN1/vOLT1/vONU1 |
| OLT/LC1/ONU2 | VAN1/vOLT1/vONU2 |
| OLT/LC1/ONU3 | VAN1/vOLT1/vONU3 |
| OLT/LC1/ONU4 | VAN2/vOLT2/vONU1 |
| OLT/LC2/ONU5 | VAN2/vOLT2/vONU2 |
| OLT/LC2/ONU6 | VAN2/vOLT2/vONU3 |
| OLT/LC2/ONU7 | VAN2/vOLT2/vONU4 |
| OLT/LC2/ONU8 | VAN3/vOLT3/vONU1 |
| OLT/LC2/ONU9 | VAN3/vOLT3/vONU2 |

In Table 1, the OLT and the ONUs may have unique physical layer IDs and virtualized layer IDs. The optical access controller 110 may configure the VANs using the physical layer IDs and the virtualized layer IDs of the OLT and the ONUs, connect slices, and manage the connected slices.

Figure 8:
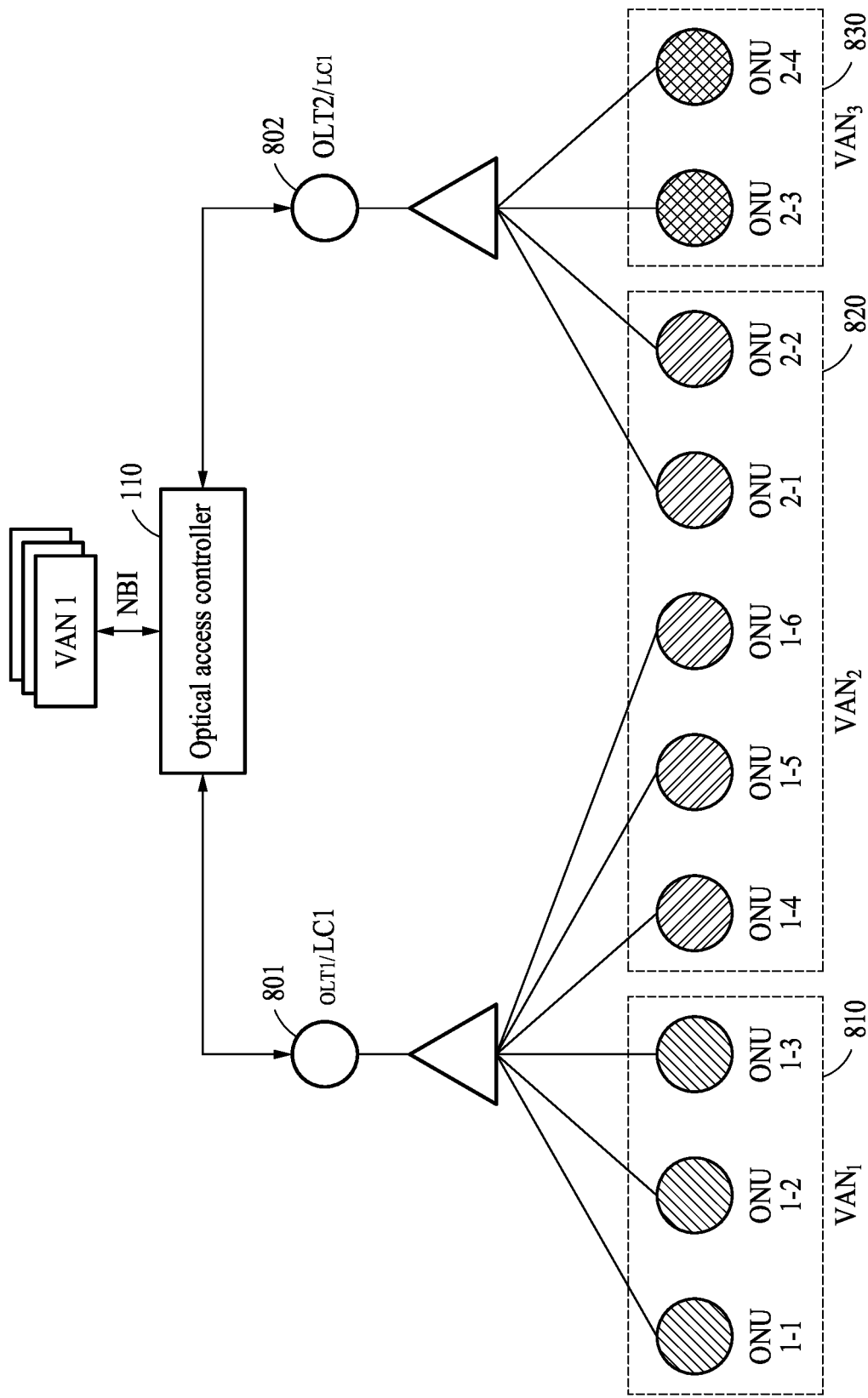
FIG. 8 illustrates another example of a connection of slices managed in an optical access network system according to a second embodiment of the present disclosure.

As illustrated in FIG. 8, an optical access network system according to a second embodiment of the present disclosure may manage connections between slices of an optical access network in which a plurality of OLTs and ONUs are virtualized.

The optical access network system according to the second embodiment of the present disclosure may configure a virtualized optical access network by designating an OLT and an ONU as virtualized OLTs and ONUs and connecting the virtualized OLTs and the virtualized ONUs. Specifically, the optical access network system according to the second embodiment of the present disclosure may configure virtual optical access networks (VAN), for example, $VAN_1$ 810, $VAN_2$ 820, and $VAN_3$ 830 by matching a plurality of ONUs and a plurality of OLTs according to Table 2.

TABLE 2

| PHY ID | Virtual ID |
|---|---|
| OLT1/LC1/ONU1-1 | VAN1/vOLT1/vONU1 |
| OLT1/LC1/ONU1-2 | VAN1/vOLT1/vONU2 |
| OLT1/LC1/ONU1-3 | VAN1/vOLT1/vONU3 |
| OLT1/LC1/ONU1-4 | VAN2/vOLT2/vONU1 |
| OLT1/LC1/ONU1-5 | VAN2/vOLT2/vONU2 |
| OLT1/LC1/ONU1-6 | VAN2/vOLT2/vONU3 |
| OLT1/LC1/ONU2-1 | VAN2/vOLT2/vONU4 |
| OLT2/LC1/ONU2-2 | VAN2/vOLT2/vONU5 |
| OLT2/LC1/ONU2-3 | VAN1/vOLT3/vONU1 |
| OLT2/LC1/ONU2-4 | VAN1/vOLT3/vONU2 |

In Table 2, the OLTs and the ONUs may have unique physical layer IDs and virtualized layer IDs. The optical access controller 110 may configure the VANs using the physical layer IDs and the virtualized layer IDs of the OLTs and the ONUs, connect slices, and manage the connected slices. Through this, the optical access controller 110 may also connect the VAN$_2$ 820 generated using an ONU physically connected to an OLT 801, with an OLT 802 that is another virtualized OLT.

Figure 9:
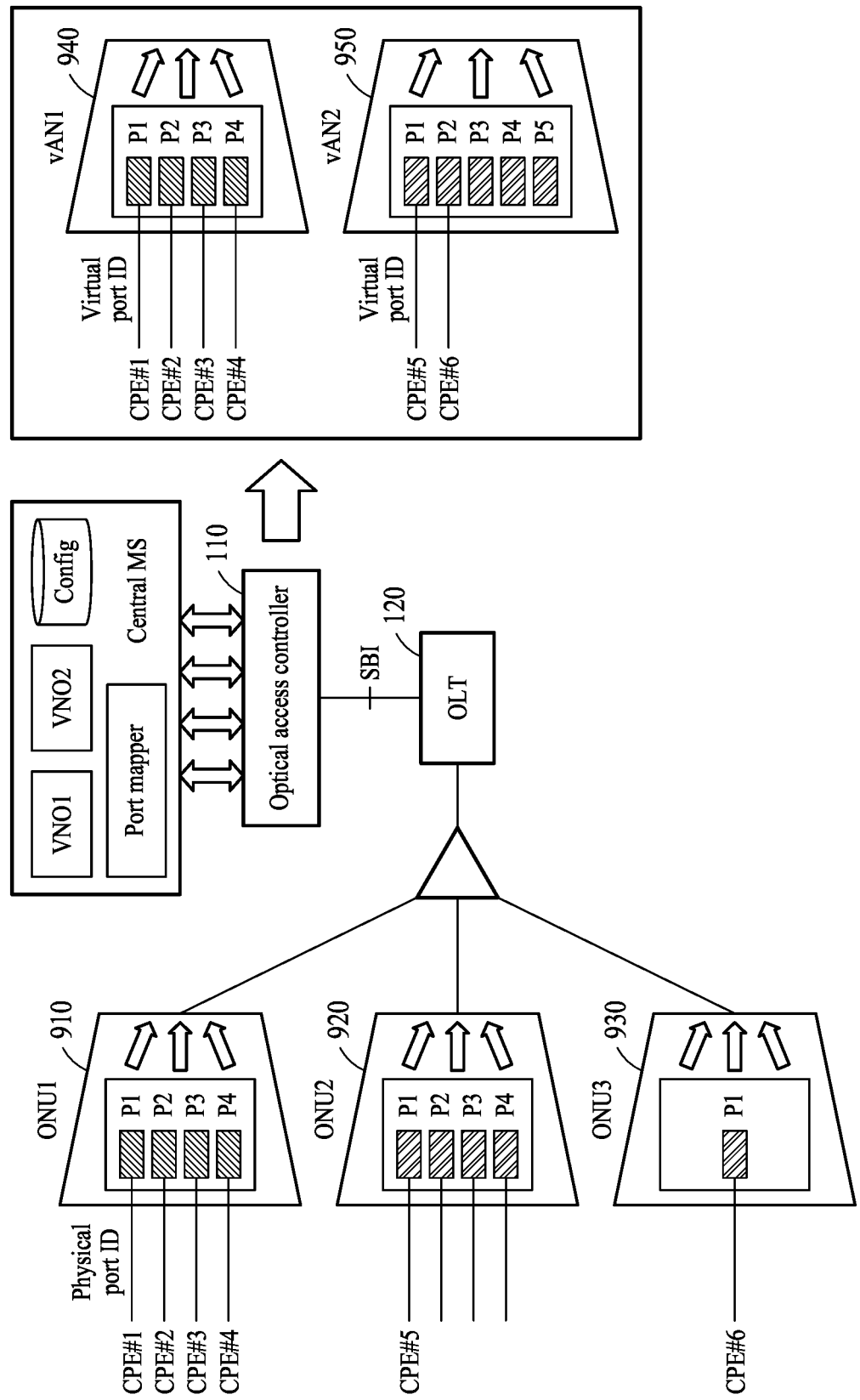
FIG. 9 illustrates another example of a connection of slices managed in an optical access network system according to a third embodiment of the present disclosure.

As illustrated in FIG. 9, an optical access network system according to a third embodiment of the present disclosure may manage connections between slices of an optical access network in which an ONU port is virtualized.

The ONU 130 may have a plurality of PON port IDs and be connected to the host device 140 using the PON port IDs. In this instance, the optical access network system may designate ports of the ONU 130 as virtualized ports and configure a virtualized optical access network by grouping virtualized ONU ports. For example, the optical access network system may virtualize ONU port IDs included in ONU1 910, ONU2 920, and ONU3 930 and configure virtual optical access networks, for example, vAN$_1$ 940 and vAN$_2$ 950 by grouping each of the virtualized ONU ports.

TABLE 3

| PHY Port ID | Virtual Port ID |
| --- | --- |
| ONU1/port1 | vAN1/port1 |
| ONU1/port2 | vAN1/port2 |
| ONU1/port3 | vAN1/port3 |
| ONU1/port4 | vAN1/port4 |
| ONU3/port1 | vAN2/port1 |
| ONU2/port2 | vAN2/port2 |
| ... | ... |

By configuring the virtual optical access networks through the grouping of each of the virtualized ONU ports, the optical access network system may configure and group the virtual optical access network for each service type of the host device 140 connected to each of the ONU1 910, the ONU2 920, and the ONU3 930, and connect and manage slices optimized for each group.

Figure 10:
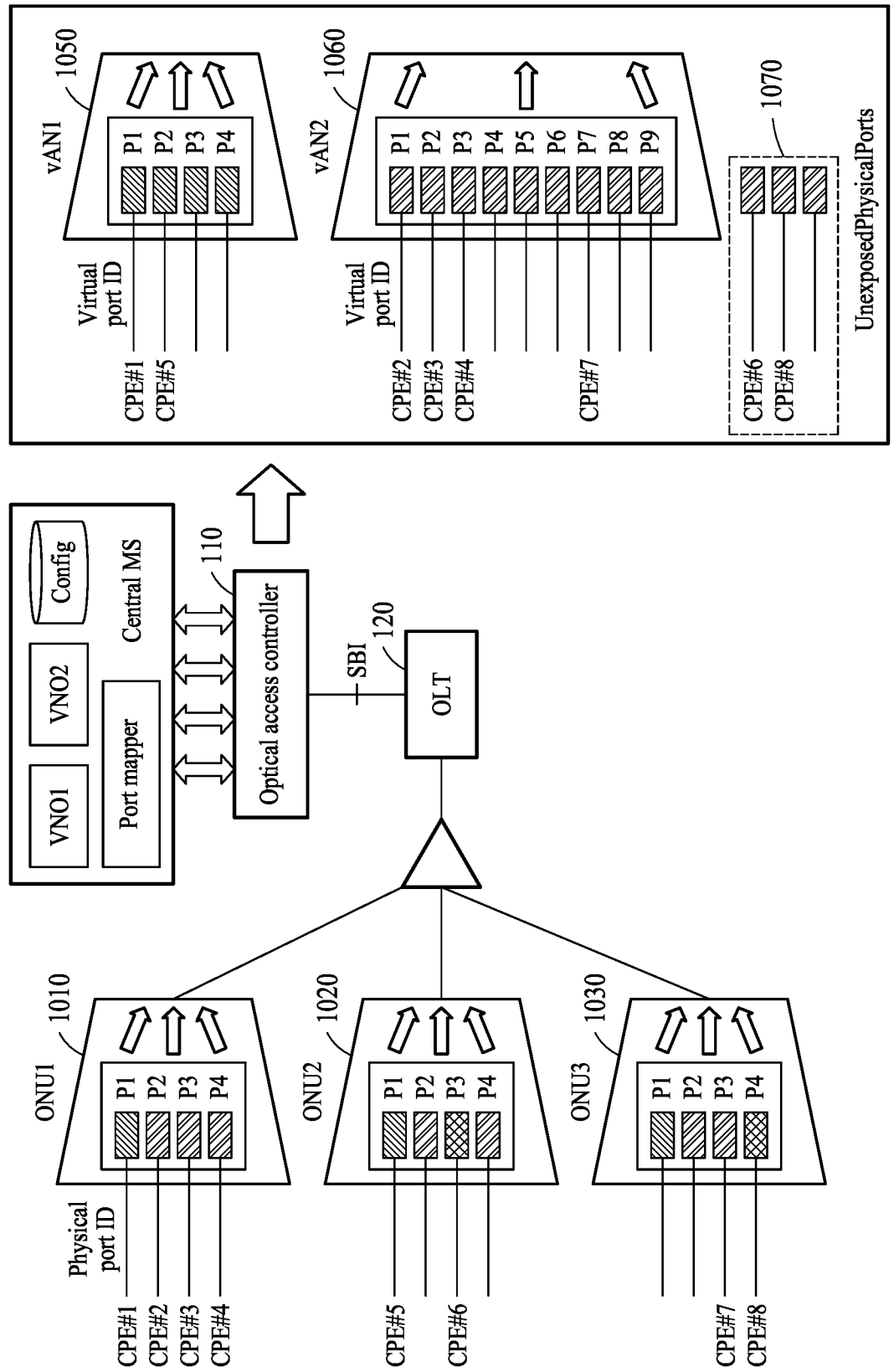
FIG. 10 illustrates another example of a connection of slices managed in an optical access network system according to a fourth embodiment of the present disclosure.

As illustrated in FIG. 10, an optical access network system according to a fourth embodiment of the present disclosure may manage connections between slices of an optical access network in which an ONU port is virtualized.

The optical access network system may designate each of ports of the ONU 130 as a virtualized port and configure a virtual optical access network by grouping ports of different ONUs virtualized. For example, the optical access network system may virtualize ONU port IDs included in ONU1 1010, ONU2 1020, and ONU3 1030 and configure virtual optical access networks, for example, vAN$_1$ 1050 and vAN$_2$ 1060 virtualized in units of queries or ports by grouping each of the virtualized ONU ports according to Table 4.

TABLE 4

| PHY ID | Virtual Port ID |
| --- | --- |
| ONU1/port1 | vAN1/port1 |
| ONU2/port1 | vAN1/port2 |
| ONU3/port1 | vAN1/port3 |
| ONU4/port4 | vAN1/port4 |
| ONU1/port2 | vAN2/port1 |
| ONU1/port3 | vAN2/port2 |
| ONU1/port4 | vAN2/port3 |
| ONU2/port2 | vAN2/port4 |
| ONU2/port4 | vAN2/port5 |

TABLE 4-continued

| PHY ID | Virtual Port ID |
| --- | --- |
| ONU3/port2 | vAN2/port6 |
| ONU3/port3 | vAN2/port7 |
| ONU4/port1 | vAN2/port8 |
| ONU4/port3 | vAN2/port9 |

By configuring the virtual optical access networks through the grouping of each of the virtualized ONU ports, the optical access network system may configure and group the virtual optical access network for each service type of the host device 140 connected to each of the ONU1 1010, the ONU2 1020, and the ONU3 1030, and connect and manage slices optimized for each group. Also, unexpected physical ports 1070 may not be configured as a virtual optical access network.

Figure 11:
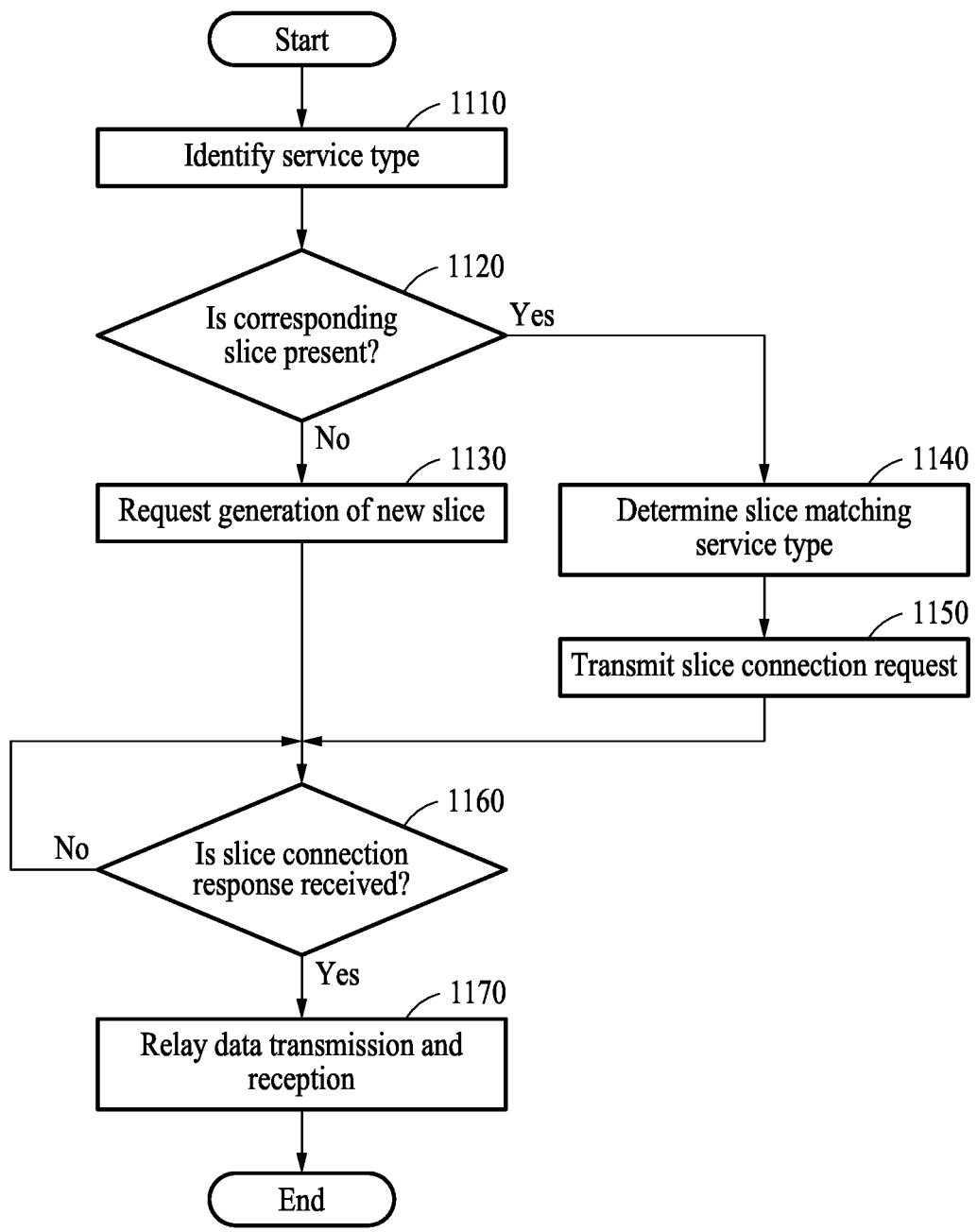
FIG. 11 is a flowchart illustrating a slice connection method performed by an optical network unit (ONU) of an optical access network according to an example embodiment of the present disclosure.

FIG. 11 is a flowchart illustrating a slice connection method performed by an ONU of an optical access network according to an example embodiment of the present disclosure.

In operation 1110, the ONU 130 may receive a service connection request from the host device 140. Also, the ONU 130 may identify a service type of the host device 140 corresponding to the service connection request received from the host device 140.

In operation 1120, the ONU 130 may retrieve the service type of the host device 140 identified in operation 1110 from prestored slice information. When a slice corresponding to the service type of the host device 140 identified in operation 1110 is found, the ONU 130 may perform operation 1140. In contrast, when a slice corresponding to the service type of the host device 140 identified in operation 1110 is not found, the ONU 130 may perform operation 1130.

In operation 1130, the ONU 130 may request the OLT 120 to generate a new slice. In this instance, the ONU 130 may request the OLT 120 to generate a new slice and transmit the service type of the host device 140 identified in operation 350.

In operation 1140, the ONU 130 may determine a slice matching the retrieved service type to be a slice corresponding to the host device 140.

In operation 1150, the ONU 130 may transmit a slice connection request corresponding to the slice determined in operation 1140, to the OLT 120, thereby requesting connection to the slice.

In operation 1160, the ONU 130 may verify whether a slice connection response is received from the OLT 120 in response to the slice connection request transmitted in operation 1150 or the request for the new slice generation made in operation 1130. When the slice connection response is received from the OLT 120, the ONU 130 may perform operation 1170. When the slice connection response is not received from the OLT 120, the ONU 130 may repetitively perform operation 1160 until the slice connection response is received from the OLT 120.

In operation 1170, the ONU 130 may transmit a service connection response to the host device 140 and relay data transmission and reception between the OLT 120 and the host device 140.

Figure 12:
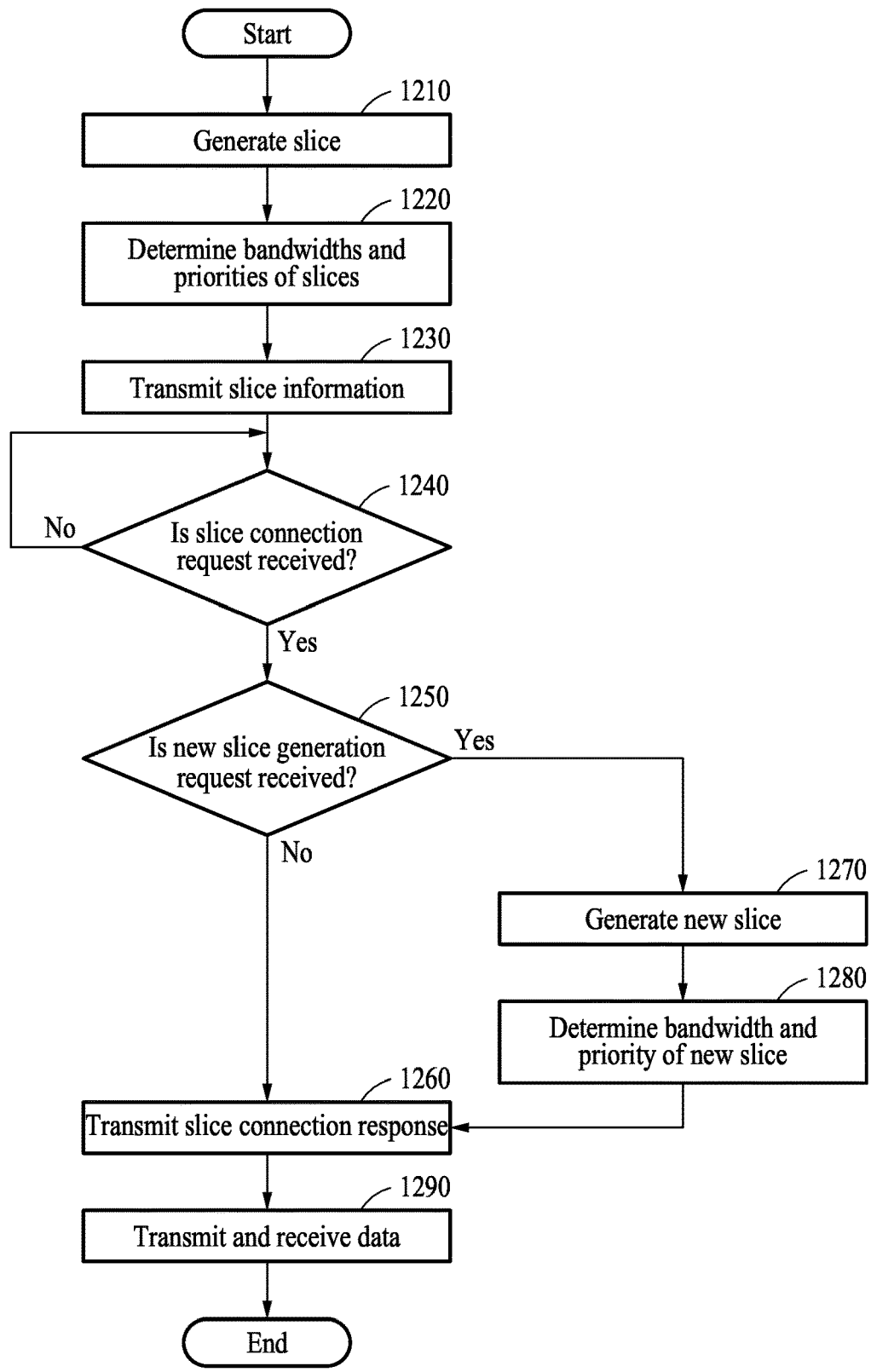
FIG. 12 is a flowchart illustrating a slice connection method performed by an optical line terminal (OLT) of an optical access network according to an example embodiment of the present disclosure.

FIG. 12 is a flowchart illustrating a slice connection method performed by an OLT of an optical access network according to an example embodiment of the present disclosure.

In operation 1210, the OLT 120 may generate a slice corresponding to a service type of a host device. Depending on an embodiment, the optical access controller 110 may perform operation 1210. In this instance, the optical access controller 110 may transmit the slice generated in operation 1210 to the OLT 120.

In operation 1220, the OLT 120 may determine bandwidths and priorities corresponding to slices generated in operation 1210 or slices received from the optical access controller 110.

In operation 1230, the OLT 120 may transmit slice information including a list of slices connectable in the OLT 120 and service types matching the slices to the ONU 130. In this instance, the slice information may include service types corresponding to the slices, bandwidths allocated to the slices, and priorities. Also, in operation 335, the OLT 120 may transmit slice information of the slice generated in operation 1210 to the optical access controller 110. In this instance, the optical access controller 110 may manage the received slice information for each service type or for each OLT 120 transmitting the slice information.

In operation 1240, the OLT 120 may verify whether a slice connection request is received from the ONU 130. When the slice connection request is received from the ONU 130, the OLT 120 may perform operation 1250. When the slice connection request is not received from the ONU 130, the OLT 120 may repetitively perform operation 1240 until the slice connection request is received from the ONU 130. In this instance, when a new slice generation request is received from the ONU 130, the OLT 120 may determine that the slice connection request is received.

In operation 1250, the OLT 120 may verify whether the new slice generation request is received from the ONU 130. When the new slice generation request is received from the ONU 130, the OLT 120 may perform operation 1270.

When the new slice generation request is not received from the ONU 130, the OLT 120 may retrieve a slice corresponding to the slice connection request from the slices generated in operation 1210. When the slice corresponding to the slice connection request is found, the OLT 120 may determine that the slice is identified and thus, perform operation 1260.

In operation 1270, the OLT 120 may generate a new slice corresponding to the service type of the host device 140 included in the new slice generation request. In this instance, the OLT 120 may retrieve a slice corresponding to the service type of the host device 140 from the slices generated in operation 1210. When a slice that corresponds to the service type of the host device 140 and does not include the ONU 130 transmitting a new slice generation request is found, a new slice may be added to a slicing including the found slice.

In operation 1280, the OLT 120 may allocate a bandwidth and a priority to the new slice generated in operation 1270.

In operation 1260, the OLT 120 may transmit a connection response to the new slice generation request or a slice connection response request to the ONU 130. In this instance, a connection response for the new slice may include information on the bandwidth and the priority allocated to the new slice.

In operation 1290, the OLT 120 may transmit and receive data to and from the host device 140 through relaying of the ONU 130.

The optical access network system for slice connection or a slice connection network of an optical access network according to the present disclosure may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A slice connection method performed by an optical network unit (ONU) in an optical access network, the method comprising:
    identifying slices corresponding to a service type of a host device; and
    transmitting a data to an optical line terminal (OLT) based on a slice determined based on the service type,
    wherein the OLT allocates bandwidth for the slice based on a dynamic bandwidth allocation (DBA).

2. The slice connection method of claim 1, further comprising:
    receiving, from the OLT, slice information comprising a list of slices connectable in the OLT and service types respectively matching the slices.

3. A computer-readable recording medium on which a program for executing the slice connection method of claim 1 is recorded.

4. A slice connection method performed by an optical line terminal (OLT) in an optical access network, the method comprising:
    identifying a slices for a service corresponding to a host device; and
    allocating a bandwidth for each slice based on a dynamic bandwidth allocation (DBA).

* * * * *